United States Patent
Tamura et al.

(10) Patent No.: US 7,180,675 B2
(45) Date of Patent: Feb. 20, 2007

(54) VIEWFINDER AND IMAGE PICKUP APPARATUS

(75) Inventors: Masaki Tamura, Kanagawa (JP); Yoshito Iwasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 10/926,316

(22) Filed: Aug. 26, 2004

(65) Prior Publication Data

US 2005/0052756 A1   Mar. 10, 2005

(30) Foreign Application Priority Data

Sep. 8, 2003   (JP)   ............................ P2003-315071

(51) Int. Cl.
G02B 25/00 (2006.01)
G02B 17/00 (2006.01)

(52) U.S. Cl. ...................................... 359/646; 359/726

(58) Field of Classification Search ........ 359/643–647, 359/726
See application file for complete search history.

(56) References Cited

U.S. PATENT DOCUMENTS

| | | | | |
|---|---|---|---|---|
| 4,291,945 A | * | 9/1981 | Hayamizu | 359/834 |
| 4,664,485 A | * | 5/1987 | Momiyama et al. | 359/645 |
| 4,731,625 A | * | 3/1988 | Nozawa | 396/384 |
| 5,467,215 A | | 11/1995 | Lebby et al. | |
| 5,644,430 A | | 7/1997 | Richard et al. | |
| 5,703,721 A | * | 12/1997 | Bietry et al. | 359/646 |
| 5,818,634 A | | 10/1998 | Richard et al. | |

FOREIGN PATENT DOCUMENTS

| | | |
|---|---|---|
| JP | 03-150515 | 6/1991 |
| JP | 08-328085 | 12/1996 |
| JP | 10-304228 | 11/1998 |
| JP | 11-190869 | 7/1999 |
| JP | 2002-072294 | 3/2002 |
| JP | 2002-267948 | 9/2002 |
| JP | 2003-066365 | 3/2003 |
| JP | 2003-098430 | 4/2003 |
| JP | 2002-303803 | 10/2004 |

OTHER PUBLICATIONS

Japanese Patent Office, Application No. 2003-315071; dated Aug. 8, 2006.

* cited by examiner

*Primary Examiner*—Scott J. Sugarman
(74) *Attorney, Agent, or Firm*—Rader, Fishman & Grauer PLLC; Ronald P. Kananen (57) ABSTRACT

A viewfinder of a small size and a small thickness is implemented to achieve a miniaturization and reduction in thickness of an image pickup apparatus. The viewfinder includes an eyepiece system for expanding an image displayed on an image display element so as to be visually observed. The eyepiece includes a first single lens disposed adjacent to the image display element and having a negative refractive power and a second single lens disposed remotely from the image display element and having a positive refractive power. A reflecting member is disposed between the first single lens and the second single lens for diverting an optical axis to a predetermined direction.

6 Claims, 8 Drawing Sheets

VIEWFINDER AND IMAGE PICKUP APPARATUS

BACKGROUND OF THE INVENTION

This invention relates to a viewfinder for confirming an image pickup range of an image pickup apparatus and, more particularly, to a viewfinder of a small size and a small thickness suitable for use with a digital image pickup apparatus, such as a digital still camera or a digital video camera, and an image pickup apparatus which uses the viewfinder.

Image pickup apparatuses such as a digital still camera and a digital video camera include an image pickup block and an observation block. The image pickup block records an optical image formed by an image pickup optical system. The observation block confirms the image pickup range of the image pickup section. Recently, the observation block is configured popularly such that an image pickup range is displayed on a LCD (Liquid Crystal Display) panel to be observed directly by an observer for the confirmation of the image pickup range.

On the other hand, several users still have a strong demand to use a viewfinder as an observation block, and many digital still cameras satisfy the demand by incorporating an optical viewfinder.

Meanwhile, digital video cameras and some digital still cameras incorporate an electronic viewfinder which expands an image displayed on a small-size LCD device using an eyepiece system to allow confirmation of an image pickup range.

In recent years, as the compaction of digital image pickup apparatuses proceeds, a reduction in size is demanded also for the observation block. Particularly for digital still cameras, a strong demand is directed to a reduction in thickness; and a demand for miniaturization and a reduction in thickness is directed also to a viewfinder.

Meanwhile, also, a higher power variation exceeding three times is demanded for a digital still camera in recent years; and, also for a viewfinder, miniaturization and a reduction in thickness while achieving a higher power magnification are demanded.

However, if a conventional optical viewfinder is used as the observation block for the image pickup apparatus described above, then in order to assure a high variable power, an increase in the size of the optical system cannot be avoided. Consequently, the demand for miniaturization cannot be satisfied.

Further, where an optical viewfinder of high variable power is used, when it is used with a high magnification, the variation of the diopter scale by the distance to the subject is so great that the user cannot observe an image well through the viewfinder. Even if a diopter scale adjusting mechanism is provided for the optical viewfinder, since the diopter scale adjusting mechanism must be used to adjust the diopter scale in accordance with the distance to the subject every time, the convenience in use of the viewfinder is very low.

One of possible solutions to the problems described above is to incorporate an electronic viewfinder. If an electronic viewfinder is used, then not only miniaturization and higher variable power can be achieved, but also an improvement in performance can be anticipated in that the diopter scale does not suffer from variation and no parallax appears. Further, thanks to the development of a LCD panel having a high luminance, the visual observability of an image is being improved significantly.

A representative one of the small-size electronic viewfinders is disclosed in Japanese Patent Laid-open No. 2002-303803 (hereinafter referred to as Patent Document 1).

In the electronic viewfinder of Patent Document 1, the power arrangement of lenses which form an eyepiece system is optimized in order to miniaturize the electronic viewfinder. However, where the configuration of the electronic viewfinder is used, it is very difficult to achieve a reduction in thickness.

SUMMARY OF THE INVENTION

It is an object of the present invention to provide a viewfinder which can be reduced in size and thickness to achieve a miniaturization and reduction in thickness of an image pickup apparatus.

In order to attain the object described above, according to an aspect of the present invention, there is provided a viewfinder, including an eyepiece system for expanding an image displayed on an image display element so as to be visually observed, the eyepiece including a first single lens disposed adjacent the image display element and having a negative refractive power, nd a second single lens disposed remotely from the image display element and having a positive refractive power, and a reflecting member disposed between the first single lens and the second single lens for diverting an optical axis to a predetermined direction.

According to another aspect of the present invention, there is provided a viewfinder, including an eyepiece system for expanding an image displayed on an image display element so as to be visually observed, the eyepiece including a first single lens disposed adjacent the image display element and having a negative refractive power and a second single lens disposed remotely from the image display element and having a positive refractive power, the second single lens having a reflecting face provided therein for diverting an optical axis to a predetermined direction.

Since the viewfinders have such configurations as described above, they can be formed in a reduced size and a reduced thickness. Consequently, an image pickup apparatus in which any of the viewfinders is incorporated can be formed in a reduced size and a reduced thickness.

The viewfinders according to the present invention can be applied to image pickup apparatuses, such as a digital still camera and a digital video camera.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENTS

FIGS. 1, 3, 5, and 7 show different viewfinders according to different embodiments 1, 2, 3, and 4 of the present invention, respectively. The viewfinders include an eyepiece system for expanding an image displayed on an image display element Go to facilitate observation by an observer. The eyepiece system includes a single concave lens (single lens) G1 and a convex lens (single lens) G2. The single concave lens G1 is disposed adjacent the image display element Go and has a negative refractive power. The convex lens (single lens) G2 is disposed remotely from the image display element Go and has a positive refractive power. The eyepiece system thus achieves a reduction of the overall length when compared with that in an alternative case wherein the same viewfinder magnification is obtained by a single convex lens.

Figure 1:
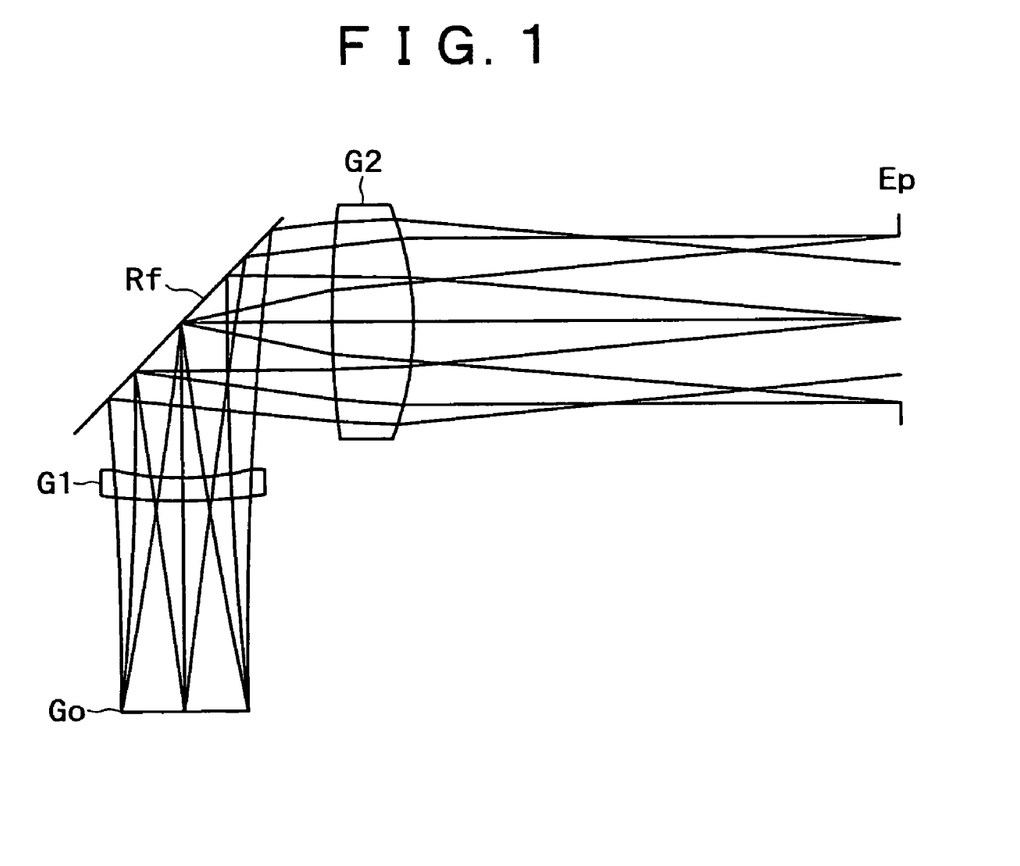
FIG. 1 is a schematic view showing a configuration of a viewfinder to which the present invention is applied.
Figure 2A:
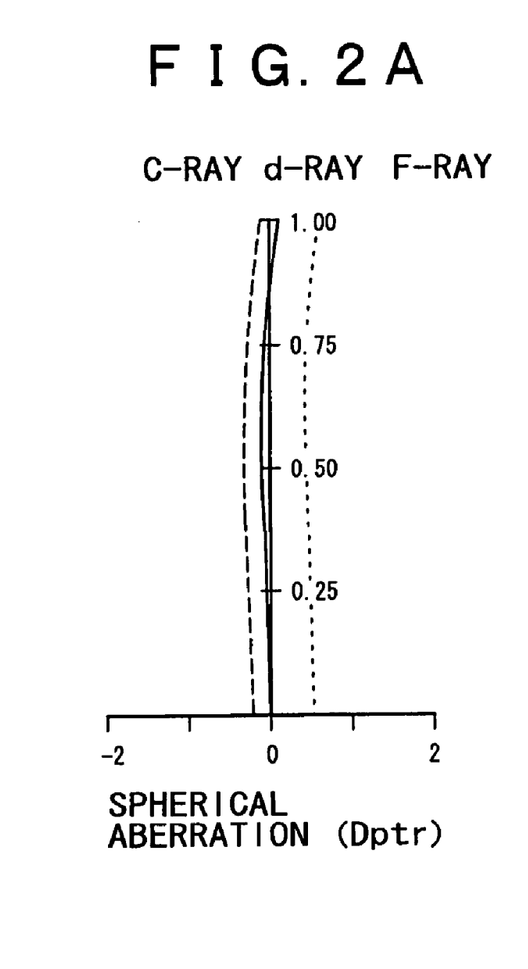
FIGS. 2A, 2B, and 2C are diagrammatic views illustrating aberrations of an eyepiece system of the viewfinder of FIG. 1.
Figure 2B:
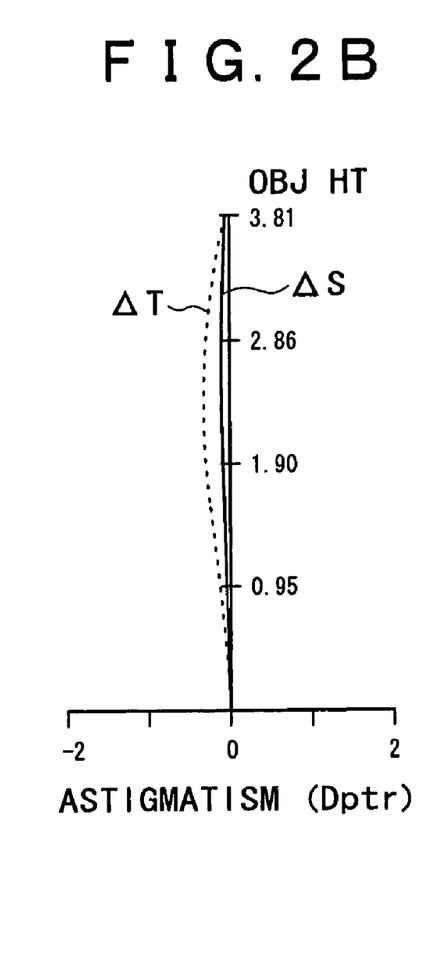
Figure 2C:
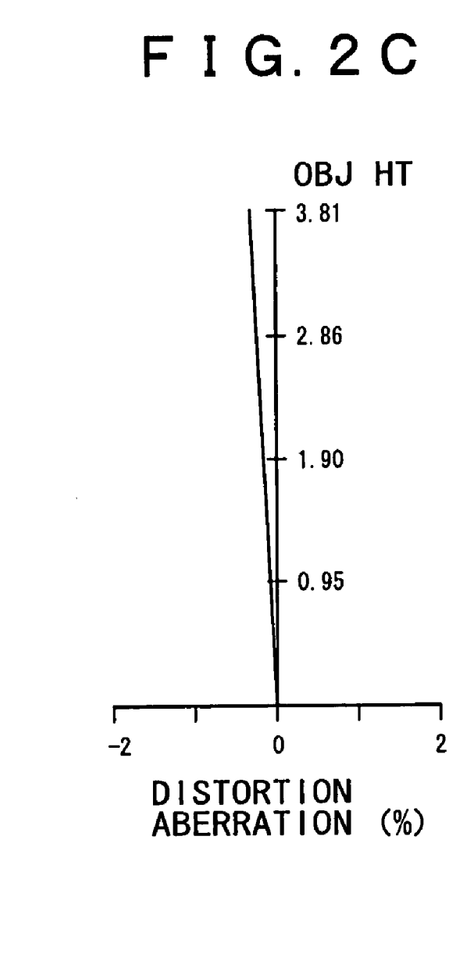
Figure 3:
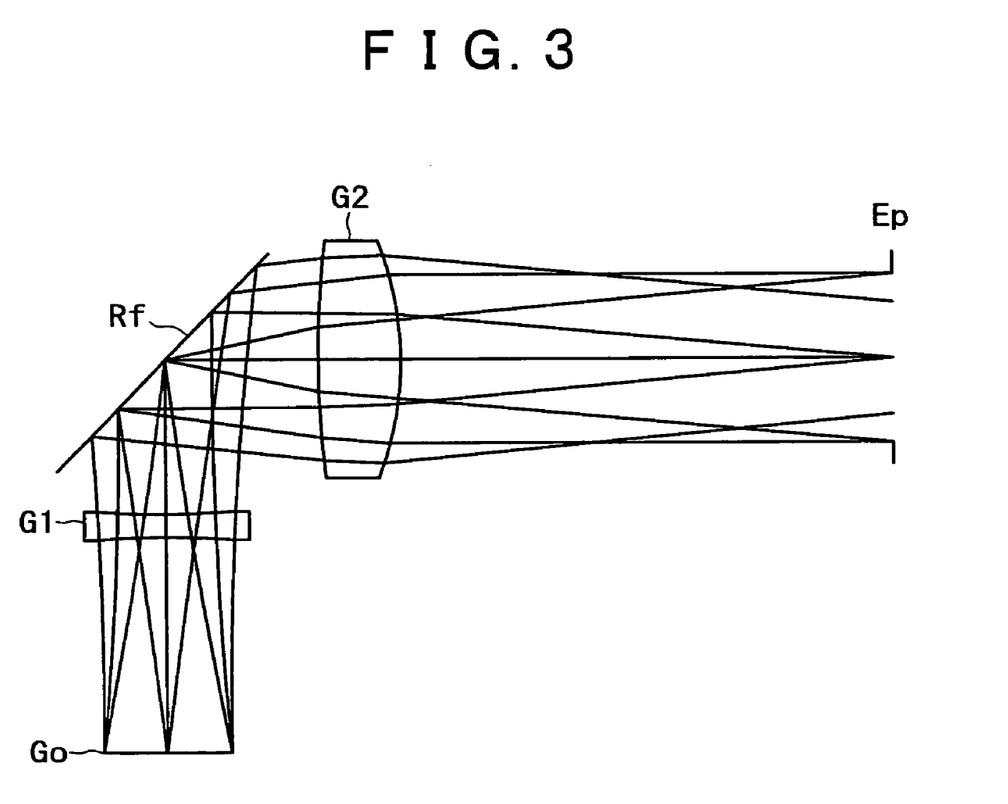
FIG. 3 is a schematic view showing a configuration of another viewfinder to which the present invention is applied.
Figure 4A:
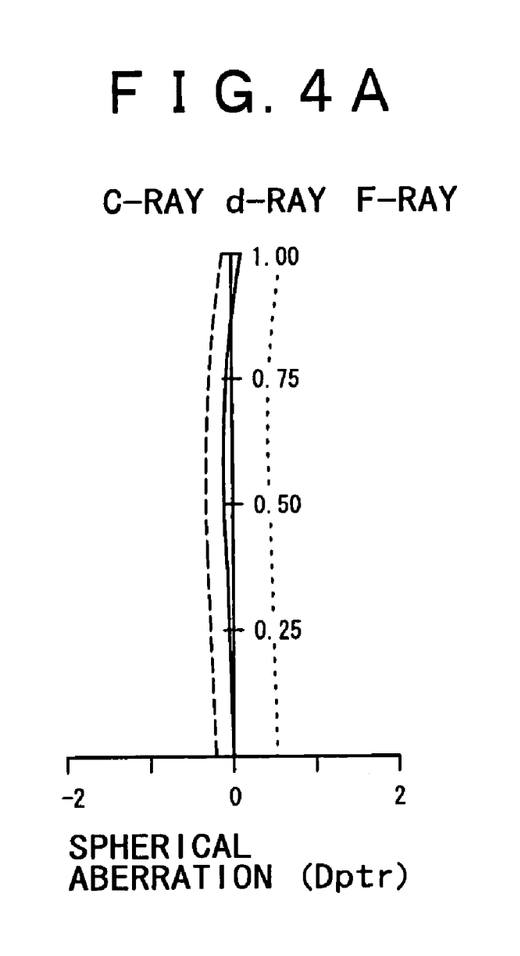
FIGS. 4A, 4B, and 4C are diagrammatic views illustrating aberrations of an eyepiece system of the viewfinder of FIG. 3.
Figure 4B:
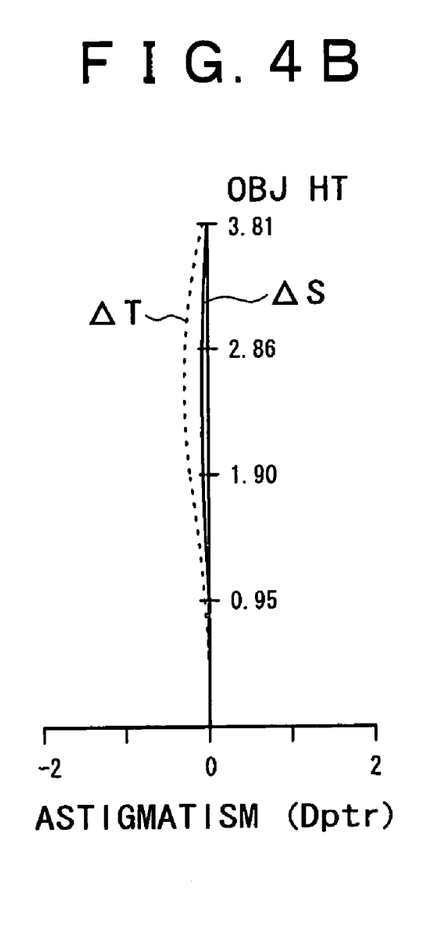
Figure 4C:
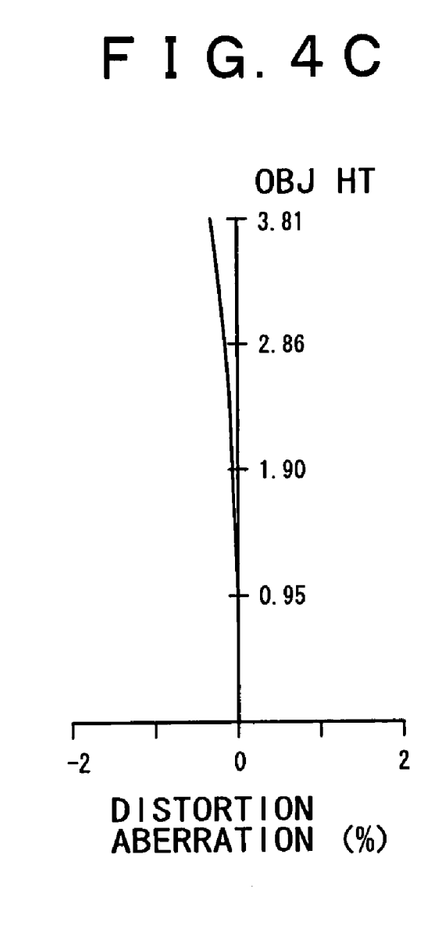

In the viewfinders shown in FIGS. 1 and 3, a reflecting member Rf for diverting the optical axis to a predetermined direction is interposed between the single concave lens G1 and the single convex lens G2.

Figure 5:
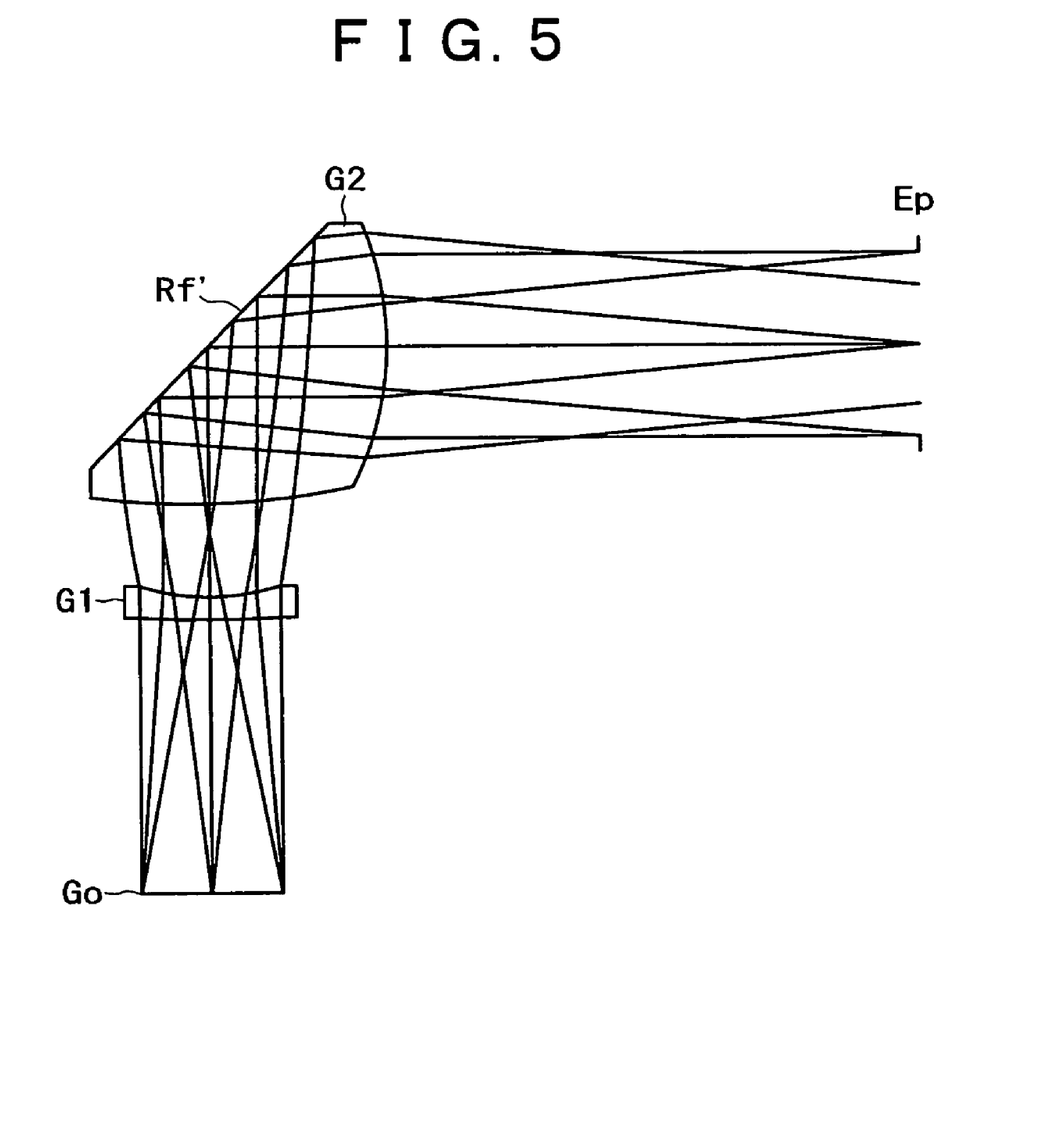
FIG. 5 is a schematic view showing a configuration of a further viewfinder to which the present invention is applied.
Figure 6A:
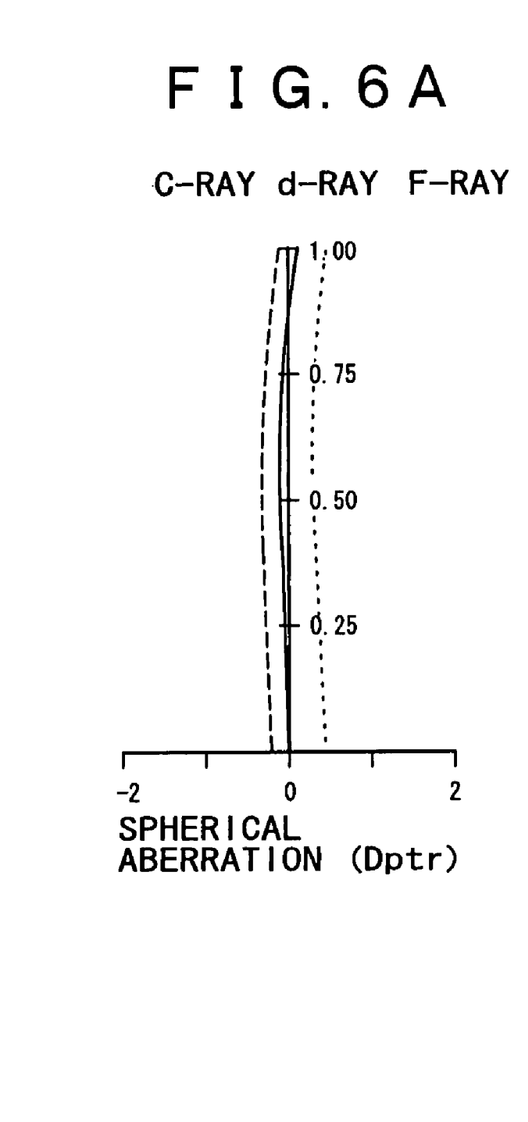
FIGS. 6A, 6B, and 6C are diagrammatic views illustrating aberrations of an eyepiece system of the viewfinder of FIG. 5.
Figure 6B:
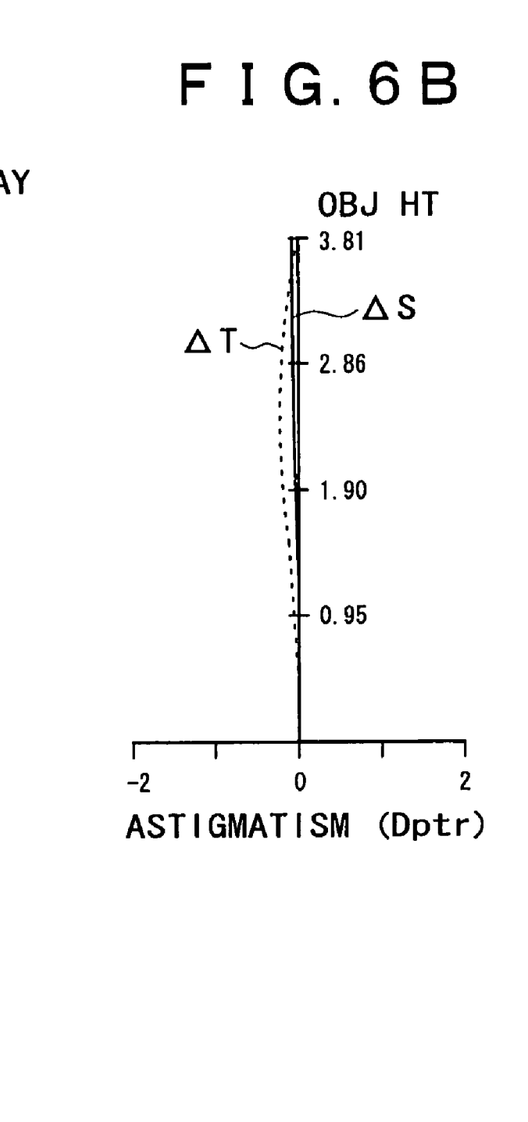
Figure 6C:
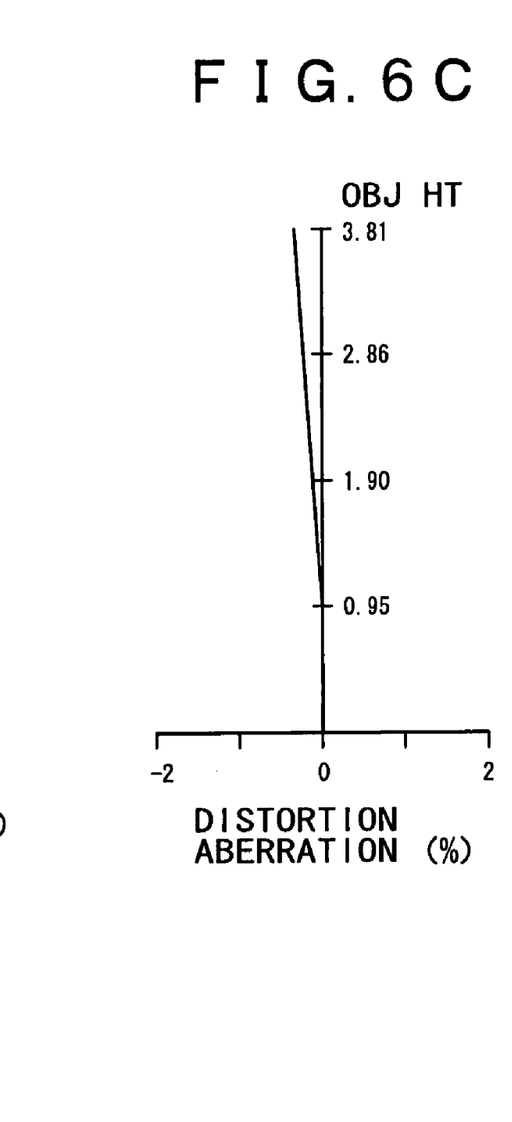
Figure 7:
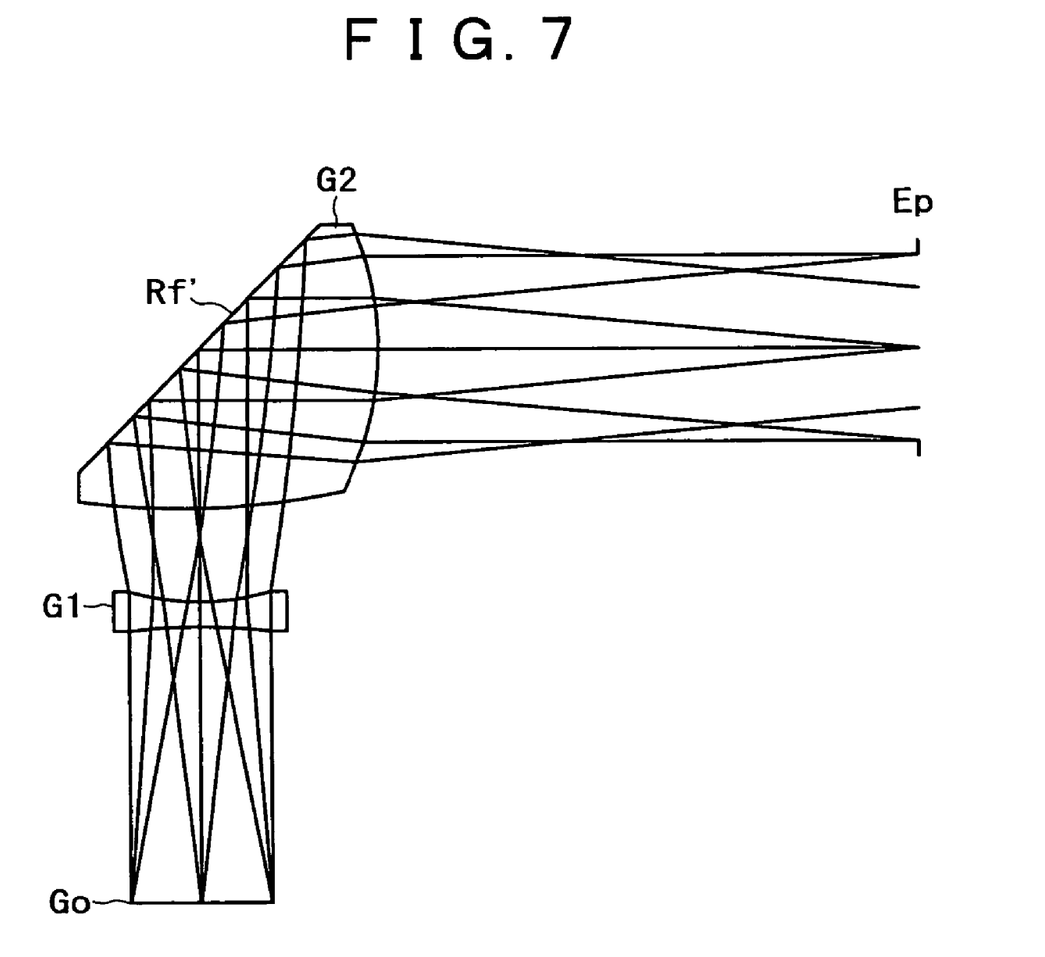
FIG. 7 is a schematic view showing a configuration of a still further viewfinder to which the present invention is applied.
Figure 8A:
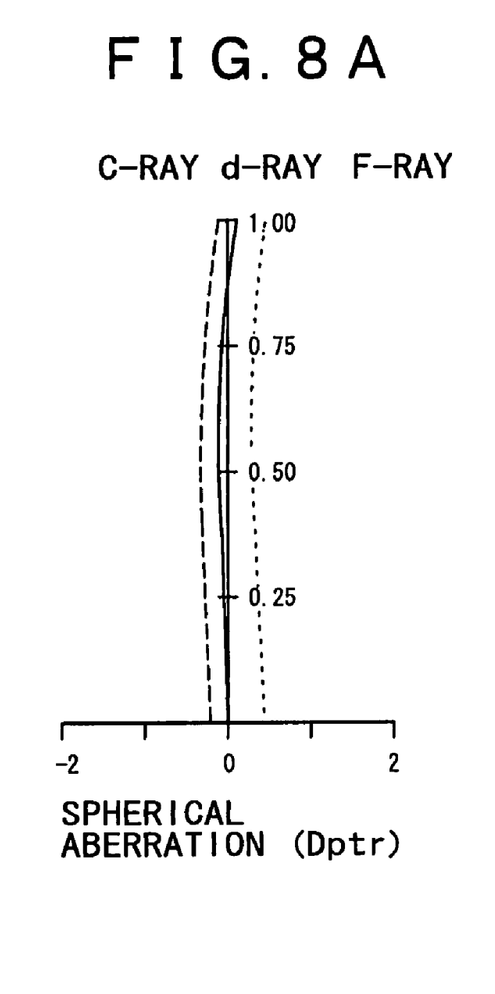
FIGS. 8A, 8B, and 8C are diagrammatic views illustrating aberrations of an eyepiece system of the viewfinder of FIG. 7.
Figure 8B:
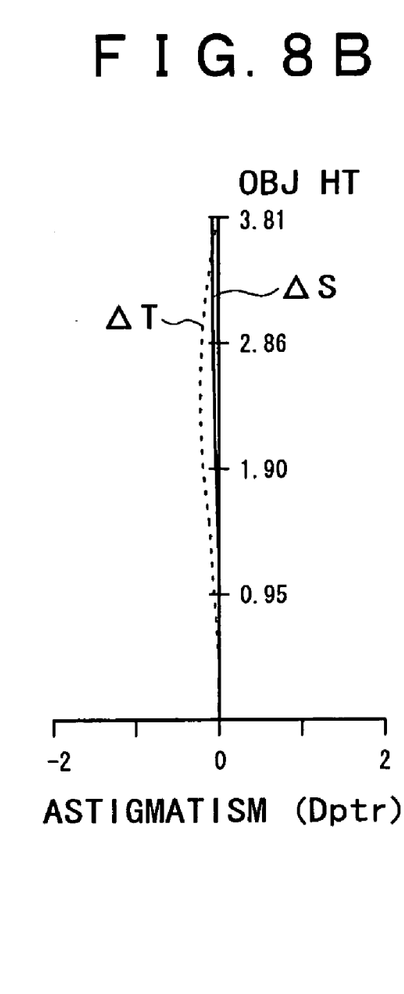
Figure 8C:
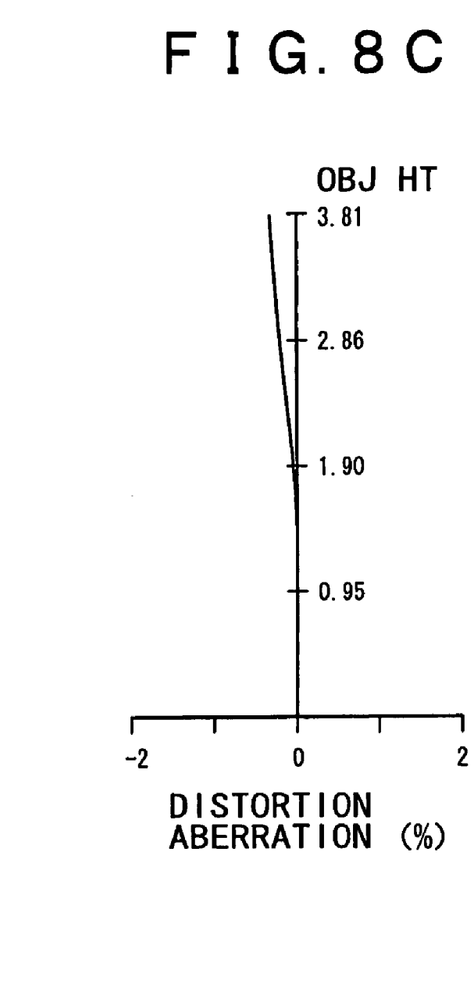

On the other hand, in the viewfinders shown in FIGS. 5 and 7, the single convex lens G2 is formed from a lens prism and has a reflecting face (reflecting member) Rf' disposed therein for diverting the optical axis to a predetermined direction.

Here, the optical axis of the eyepiece system is bent at the reflecting member Rf or the reflecting face Rf' to the thicknesswise direction of the image pickup apparatus in which the viewfinder is incorporated. Consequently, a viewfinder of a reduced thickness suitable for an image pickup apparatus of a reduced thickness can be implemented.

Where the distance between the image display element Go and the eyepiece system can be changed relatively to adjust the viewfinder diopter scale, the observer can observe an image better through the viewfinder.

It is to be noted that, in order to adjust the diopter scale of the viewfinder, the convex lens G2 having a positive refractive factor and forming the eyepiece system may be moved solely in a direction substantially parallel to the incoming side optical axis.

Such lens configuration and conditions as described above are satisfied to implement a viewfinder of a small size and a small thickness.

In the following, particular examples of numerical values corresponding to the viewfinders of the different embodiments are specified. It is to be noted that the following characters are used in the description of the viewfinders:

Si, ith face as counted from the object side;

Ri, radius of curvature of the face Si;

di, distance between the ith face and the i+1th face from the object side;

ni, refractive power of the ith lens with respect to the d-ray (wavelength: 587.6 nm);

vi, Abbe number of the ith lens; and

*, face for which an aspheric surface is applied.

The shape of the aspheric surface is defined by the following expression 1 where X represents the depth of the aspherical face and H represents the height from the optical axis.

$$X = \frac{H^2/R}{1+\sqrt{1-(H/R)^2}} + AH^4 + BH^6 + CH^8 + DH^{10} \quad \text{[Expression 1]}$$

where A, B, C, and D are fourth-, sixth-, eighth-, and tenth-order aspheric surface coefficients, respectively.

Data of the viewfinder of the embodiment 1 are given below. Table 1 indicates data indicative of a configuration of the optical system; and Table 2 indicates data indicative of aspheric surface coefficients.

TABLE 1

| Si | Ri | di | ni | vi |
|---|---|---|---|---|
| 1 | IMAGE DISPLAY ELEMENT | 6.06 | | |
| 2 | 25.000 | 0.80 | 1.5826 | 29.0 |
| 3* | 10.078 | 5.50 | | |
| 4 | REFLECTING MEMBER | 5.50 | | |
| 5 | 50.000 | 2.80 | 1.4920 | 57.4 |
| 6* | −11.423 | 17.20 | | |
| 7 | EYE POINT | | | |

Width L across corner of image display element 7.62
Focal length f of eyepiece system 25.0

TABLE 2

| Si | A | B | C | D |
|---|---|---|---|---|
| 3* | 1.61E−04 | −4.59E−06 | 1.45E−06 | −6.72E−08 |
| 6* | −9.79E−05 | 5.64E−06 | −2.24E−07 | 3.01E−09 |

Data of the viewfinder of the embodiment 2 are below. Table 3 indicates data indicative of a configuration of the optical system; and Table 4 indicates data indicative of aspheric surface coefficients.

TABLE 3

| Si | Ri | di | ni | vi |
|---|---|---|---|---|
| 1 | IMAGE DISPLAY ELEMENT | 6.06 | | |
| 2 | −50.000 | 0.80 | 1.5826 | 29.0 |
| 3* | 23.745 | 5.50 | | |
| 4 | REFLECTING MEMBER | 5.50 | | |
| 5 | 34.650 | 2.80 | 1.4920 | 57.4 |
| 6* | −12.580 | 17.20 | | |
| 7 | EYE POINT | | | |

Width L across corner of image display element 7.62
Focal length f of eyepiece system 25.0

TABLE 4

| Si | A | B | C | D |
|---|---|---|---|---|
| 3* | 1.34E−04 | 1.29E−05 | −2.31E−07 | −9.64E−09 |
| 6* | −1.09E−04 | 5.68E−06 | −2.26E−07 | 3.10E−09 |

Data of the viewfinder of the embodiment 3 are given below. Table 5 indicates data indicative of a configuration of the optical system; and Table 6 indicates data indicative of aspheric surface coefficients.

TABLE 5

| Si | Ri | di | ni | νi |
|---|---|---|---|---|
| 1 | IMAGE DISPLAY ELEMENT | 6.06 | | |
| 2 | 75.600 | 0.80 | 1.5826 | 29.0 |
| 3* | 8.217 | 3.00 | | |
| 4 | 29.000 | 5.20 | 1.5247 | 56.2 |
| 5 | REFLECTING MEMBER | 5.80 | | |
| 6* | −9.577 | 17.20 | | |
| 7 | EYE POINT | | | |

Width L across corner of image display element 7.62
Focal length f of eyepiece system 25.0

TABLE 6

| Si | A | B | C | D |
|---|---|---|---|---|
| 3* | 2.15E−04 | 6.40E−06 | 7.08E−07 | −5.33E−08 |
| 6* | 7.53E−05 | −4.72E−06 | 1.87E−07 | −2.48E−09 |

Data of the viewfinder of the embodiment 4 are given below. Table 7 indicates data indicative of a configuration of the optical system; and Table 8 indicates data indicative of aspheric surface coefficients.

TABLE 7

| Si | Ri | di | ni | νi |
|---|---|---|---|---|
| 1 | IMAGE DISPLAY ELEMENT | 6.06 | | |
| 2 | −68.500 | 0.80 | 1.5826 | 29.0 |
| 3* | 8.911 | 3.00 | | |
| 4 | 18.700 | 5.20 | 1.5247 | 56.2 |
| 5 | REFLECTING MEMBER | 5.80 | | |
| 6* | −9.980 | 17.20 | | |
| 7 | EYE POINT | | | |

Width L across corner of image display element 7.62
Focal length f of eyepiece system 25.0

TABLE 8

| Si | A | B | C | D |
|---|---|---|---|---|
| 3* | 1.53E−04 | 2.18E−05 | −9.94E−07 | 4.32E−09 |
| 6* | 9.83E−05 | 5.41E−06 | −2.33E−07 | 3.27E−09 |

While preferred embodiments of the present invention have been described using specific terms, such description is for illustrative purpose only, and it is to be understood that changes and variations may be made without departing from the spirit or scope of the following claims.

What is claimed is:

1. A viewfinder, comprising:
an eyepiece system for expanding an image displayed on an image display element so as to be visually observed;
said eyepiece including a first single lens disposed adjacent to said image display element and having a negative refractive power and a second single lens disposed remotely from said image display element and having a positive refractive power; and
said second single lens having a reflecting face provided therein for diverting an optical axis to a predetermined direction.

2. The viewfinder according to claim 1, wherein the distance of said eyepiece system from said image pickup element is changed relatively to perform an adjustment of the diopter scale.

3. The viewfinder according to claim 1, wherein said second single lens which composes said eyepiece system is moved in a direction parallel to an incoming side optical axis to perform an adjustment of the diopter scale.

4. An image pickup apparatus, comprising:
an image pickup system;
an image pickup element for converting an optical image formed by said image pickup system into an electric signal;
an image display element for displaying the image obtained by the conversion by said image pickup element; and
an eyepiece system for expanding an image displayed on an image display element so as to be visually observed;
said eyepiece including a first single lens disposed adjacent to said image display element and having a negative refractive power and a second single lens disposed remotely from said image display element and having a positive refractive power; and
said second single lens having a reflecting face provided therein for diverting an optical axis to a predetermined direction.

5. The image pickup apparatus according to claim 4, wherein the distance of said eyepiece system from said image pickup element is changed relatively to perform an adjustment of the diopter scale.

6. The image pickup apparatus according to claim 4, wherein said second single lens which composes said eyepiece system is moved in a direction parallel to an incoming side optical axis to perform an adjustment of the diopter scale.

* * * * *